Oct. 1, 1935.  G. LEVENE  2,016,151
PHANTOSCOPE
Filed Aug. 24, 1934   3 Sheets-Sheet 1
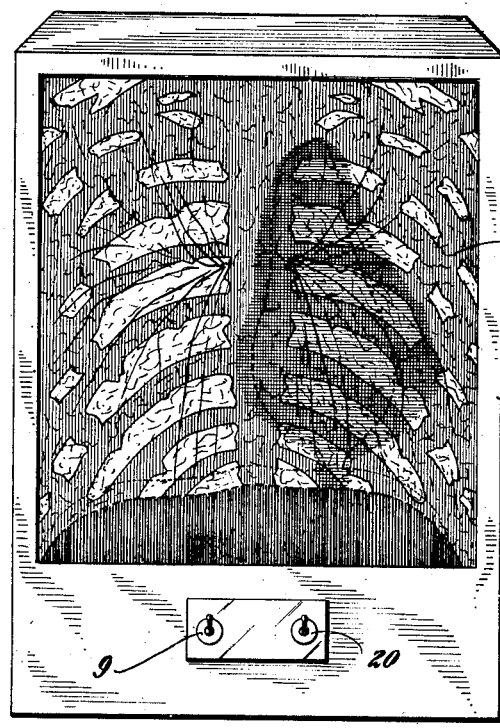
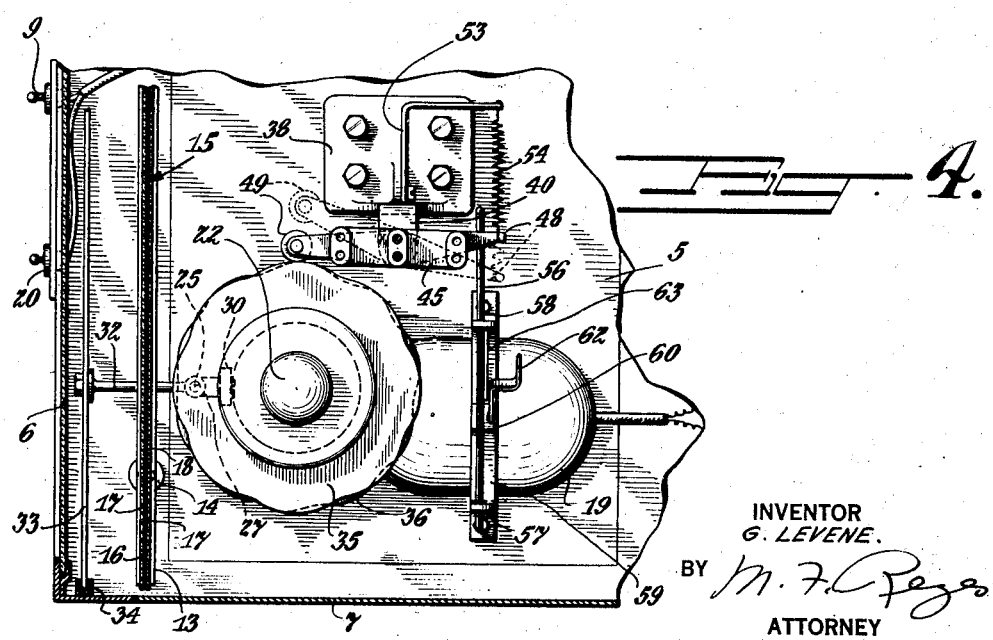
INVENTOR
G. LEVENE.
BY
ATTORNEY Oct. 1, 1935.  G. LEVENE  2,016,151
PHANTOSCOPE
Filed Aug. 24, 1934  3 Sheets-Sheet 2
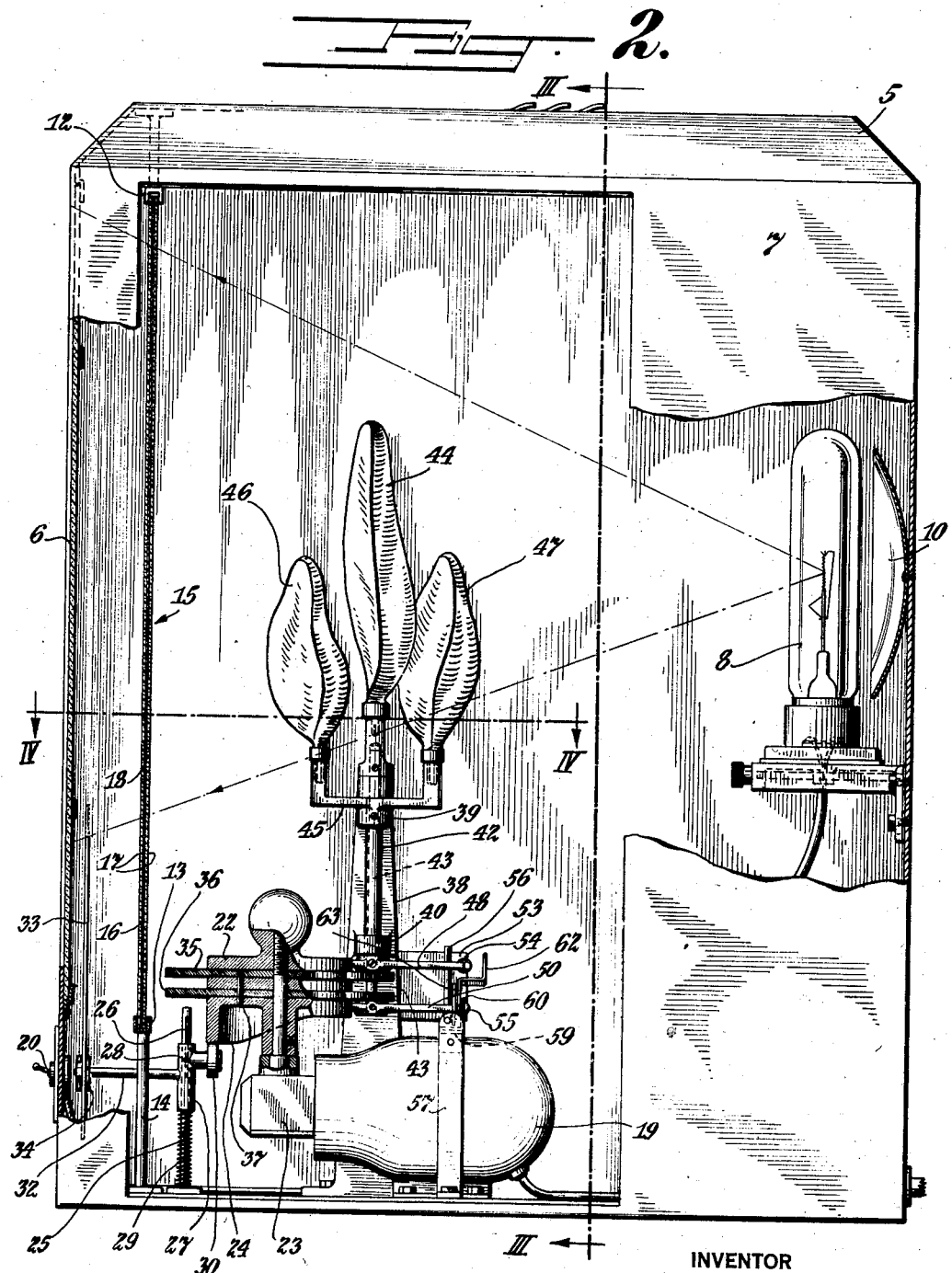
INVENTOR
G. LEVENE.
BY
ATTORNEY Oct. 1, 1935.  G. LEVENE  2,016,151
PHANTOSCOPE
Filed Aug. 24, 1934   3 Sheets-Sheet 3
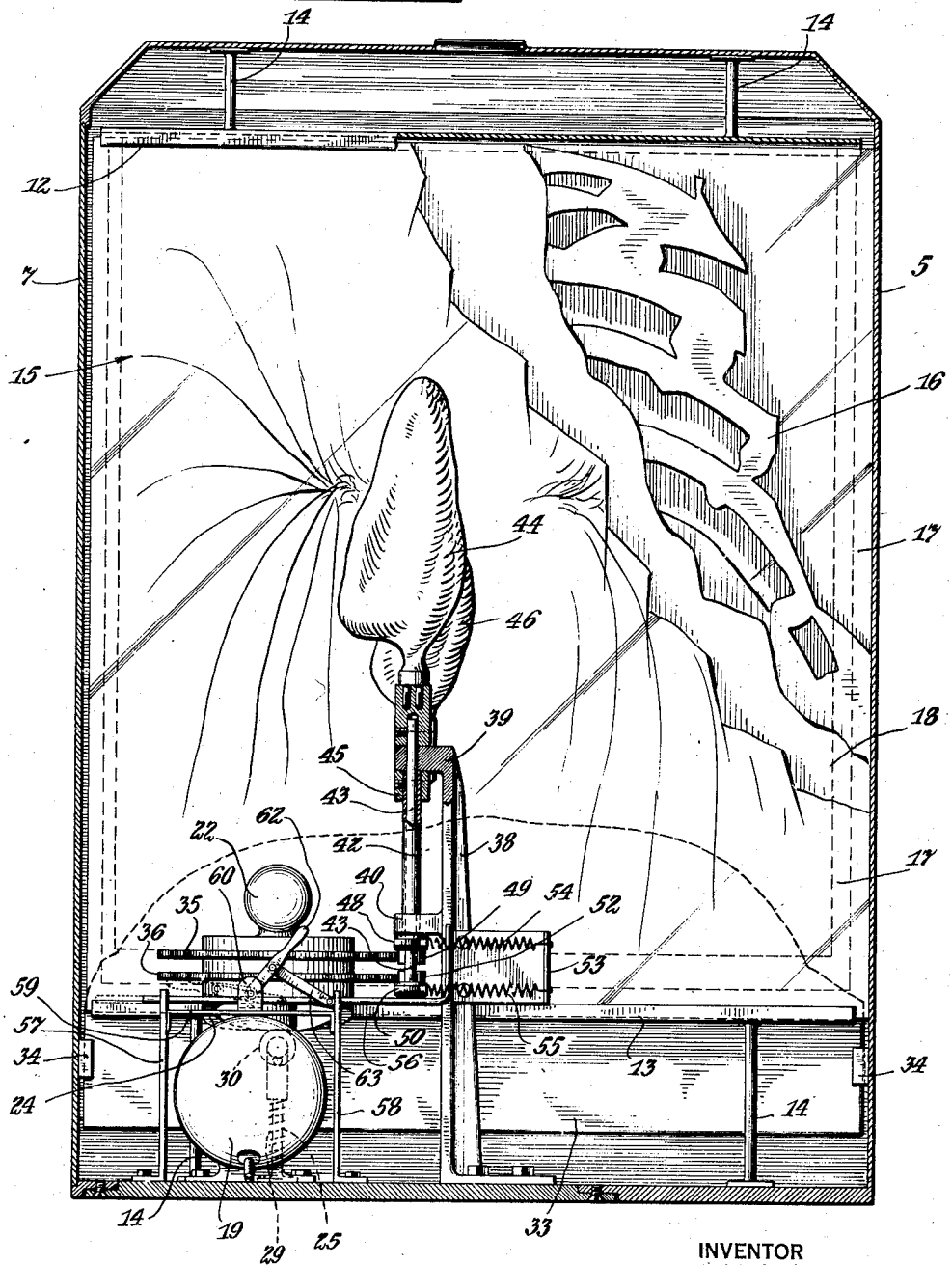
INVENTOR
G. LEVENE.
BY
ATTORNEY Patented Oct. 1, 1935

2,016,151

UNITED STATES PATENT OFFICE 2,016,151

PHANTOSCOPE

George Levene, Norwood, Mass., assignor to Westinghouse X-Ray Company, Inc., Long Island City, N. Y., a corporation of Delaware Application August 24, 1934, Serial No. 741,194

6 Claims. (Cl. 35—17)

My invention relates to X-ray devices and more particularly to a device for accurately portraying the human anatomy and movements of various organs thereof, such as the heart, lungs, stomach, etc., as actually seen during a fluoroscopic examination thus rendering the device highly desirable from an educational standpoint.

In the making of fluoroscopic examinations it is necessary that they not only be made in a dark room, but also that the X-ray tube be energized for considerably longer periods of time than required for radiographic exposures. Moreover, if the fluoroscopic examination is of very long duration such as in instances where it is desired to study the action of various moving parts of the body as the heart and lungs, it frequently becomes necessary to intermittently energize the X-ray tube to prevent undue heating thereof. This accordingly renders it somewhat difficult to utilize a subject to portray the action of various parts of the body as viewed fluoroscopically for educational and similar purposes.

It is accordingly an object of my present invention to provide a device for depicting certain parts of the human anatomy and the motion of various organs thereof, as viewed during a fluoroscopic examination, in order that their action may be accurately studied during several cycles.

Another object of my present invention is the provision of a device for educational purposes wherein certain parts of the human anatomy and the normal function of various organs thereof may be accurately portrayed as actually observed during a fluoroscopic examination without the necessity of subjecting a patient to X-rays for prolonged periods of time.

Still further objects of my present invention will become obvious to those skilled in the art to which it appertains by reference to the accompanying drawings wherein:

Figure 1 is a front elevational view of my viewing device depicting a portion of the human anatomy and showing the shape and motion of various organs.

Figure 2 is a side elevational view of my device partly in section and having parts thereof broken away to better illustrate the mechanism.

Fig. 3 is an elevational view partly in section taken on the line III—III of Fig. 2 with a portion of the device broken away for illustrative purposes.

Fig. 4 is a fragmentary plan view of a portion of my device taken on the line IV—IV in Fig. 2.

Referring now to the drawings in detail I have shown in the several figures a cabinet 5 of sheet metal or the like having a translucent window 6 of glass and a closure member, such as a door 7. A source of illumination, such as an incandescent lamp 8 is positioned interiorly of the cabinet, which is energizable from a suitable source of electrical energy upon closure of a switch 9 disposed in the front of the cabinet. A reflector 10 is positioned rearwardly of the lamp and the interior of the cabinet is provided with a reflecting surface so that all direct and indirect light is projected toward the transparent window 6.

A pair of channel members 12 and 13 are disposed transversely of the cabinet 5 immediately in back of the translucent window and are rigidly supported by suitable means such as pedestal brackets 14. A composite plate 15 slidably engages the channel members 12 and 13 and is thus disposed between the source of illumination and the translucent window 6 so that the light rays impinge thereupon. In order to make this plate depict certain parts of the anatomy of a human being, as actually observed upon a fluorescent screen during a fluoroscopic examination, I utilize a piece of translucent paper or thin cardboard, such as shown at 16, and cut away portions thereof but leaving portions to simulate the bones and other thick parts of the human anatomy, which absorb the X-rays during the usual fluoroscopic examination. This sheet is disposed between two sheets of glass 17 to hold it firmly in a position simulating the posture of a patient and distributed at random over the front side of the cardboard or sheet I place a material, such as fine cotton or the like 18, which portrays the small veins and other minute tissues normally observed. Should it be preferred in some instances I may utilize an actual X-ray negative film in lieu of the translucent paper or thin cardboard.

For the purpose of illustrating the normal motion of various organs of the body, such as the heart, lungs, and stomach, I provide the interior of the cabinet with mechanism operable to cause a shadow to be observed from the front of the cabinet which is movable in the same manner as the actual organs of the body observed during a fluoroscopic examination.

This mechanism may comprise an electric motor 19 energizable from a suitable source of electrical energy, in the same manner as the lamp 8, upon closure of a switch 20 which may also be disposed in the front of the cabinet. A rotatable member 22 is connected through reduction gearing 23 to the shaft of the electric motor 19 and the lower peripheral edge of this member is provided with a cam surface 24. A stud 25 extends upwardly from the bottom of the cabinet which is provided with an elongated slot 26.

A collar 27 slidably engages this stud 25, being prevented from rotation thereabout by a set screw 28 engaging the slot 26, and a biasing spring 29 is interposed between the base of the cabinet and this collar for the purpose of maintaining a roller 30, carried by the collar 27, in engagement with the cam surface 24. A short shaft 32 is rigidly secured to and forms a part of the collar 27, which extends toward the front of the cabinet and secured to the end of this shaft is a plate 33 disposed in back of the translucent window 6. This plate extends transversely of the cabinet 5, being slidably held in place by means of loose fitting channels 34 to permit reciprocatory movement, and is so constructed as to simulate the contraction and expansion of certain muscles caused by breathing of a patient as observed during a fluoroscopic examination. Upon rotation of the member 22, which is contacted by the roller 30, the collar 27 is caused to reciprocate up and down upon the stud 25 against the potential energy of the spring 29 and causes a like reciprocatory movement of the plate 33 so that the shadow cast upon the translucent window 6 resembles the action of the normal human organs.

The rotatable member 22 is further provided with a pair of cam surfaces 35 and 36 which may be in the form of plates or the like rigidly secured to this member as by means of a pin 37. An elongated bracket 38 is supported by the base of the cabinet and extends upwardly therefrom being provided with laterally extending portions 39 and 40 forming bearings. A pair of concentric shafts 42 and 43 are journaled within the lower bearing 40 and the inner shaft 43 extends through the bearing 39 with the upper end thereof having secured thereto a metallic member 44 of a configuration adapted to cast a shadow simulating that of the human heart.

The upper portion of the outer shaft 42 is journaled upon the inner shaft 43 and at its upper end has rigidly secured thereto a bifurcated member 45 with each branch thereof in turn provided with a metallic member 46 and 47, respectively, which upon illumination of the lamp 8, causes a shadow to be superimposed upon the translucent window 6 depicting the configuration of the human lungs as observed during a fluoroscopic examination. In order to portray the natural contraction and expansion of the heart and lungs, as actually observed, the metallic members 44, 46 and 47 are caused to oscillate by the rotary movement of the member 22. To this end the lower end of the shaft 42 is provided with a rocker arm 48 rigidly secured thereto which is provided with a roller 49 contacting the cam surface 35. Likewise a rocker arm 50 is rigidly secured to the lower end of the shaft 43 having a roller 52 secured thereto and establishing contact with the remaining cam surface 36.

The bracket or upright 38 is provided with a further lateral extension 53 rigidly secured thereto and a pair of coil springs 54 and 55 are connected to this extension and to the rocker arms 48 and 50, respectively, for the purpose of normally maintaining the rollers 49 and 52 carried by these rocker arms in firm contact with the respective cam surfaces 35 and 36. When the member 22 is accordingly rotated by the electric motor 19 the surfaces 35 and 36 are thus rotated causing a rocking motion of both the rocker arms 48 and 50. These latter arms being rigidly secured to the respective shafts 42 and 43 will cause reciprocating rotary motion thereof with attendant oscillation of the metallic members 44, 46 and 47. The shadow cast by these members upon the composite plate 15, which depicts the various organs, hereinbefore referred to, thus fluctuates in size giving an accurate visual indication from the front of the cabinet and upon the translucent window 6 of a contraction and expansion of these organs as actually observed during a fluoroscopic examination.

For the purpose of preventing oscillatory movement of the metallic parts 44, 46 and 47, in order to remove or exchange any particular one, I provide a disengaging mechanism comprising a substantially L-shaped rod or shaft 56 adapted to be moved into engagement with both rocker arms 48 and 40, at the opposite side of their respective pivot points to that of the rollers 49 and 52, thus causing contact of the latter with the cam surfaces 35 and 36 to be broken. This shaft 56 is slidably supported by a pair of uprights or brackets 57 and 58, as seen more clearly in Fig. 3, supported upon the base of the cabinet 5. A tie brace 59 interconnects these uprights 57 and 58 adjacent their upper extremity which is provided with a lug 60 having a lever 62 pivoted thereto.

This lever is in turn pivotally connected by a link or the like 63 to the shaft 56 so that movement of the lever 62 about its pivot causes a sliding movement of this shaft with engagement and disengagement of the angularly disposed portion thereof with the rocker arms 48 and 50. When the rod or shaft 56 engages these rocker arms they are rotated, as above noted, to interrupt contact of the rollers with the cam surfaces and upon disengagement of the shaft 56 the rollers carried by the rocker arms are again forced into contact with the cam surfaces by the potential energy of the coil springs 54 and 55.

It thus becomes obvious to those skilled in the art that I have provided an X-ray device adaptable for educational and kindred purposes which accurately portrays the human anatomy together with the natural movement of various organs thereof as observed during the fluoroscopic examination of a patient.

Moreover, the necessity for a prolonged examination of a patient, while actually subjected to X-rays in a darkened room, is entirely eliminated and at the same time a natural portrayal of the body and movement of various organs, such as the heart, lungs and stomach, may be observed for any desired periods of time.

Although I have shown and described one specific embodiment of my invention I do not desire to be limited thereto as various other modifications thereof may be made without departing from the spirit and scope of the appended claims.

Having thus described my invention I claim:—

1. An educational device for medical students that depicts an image of the human anatomy and the natural motion of various organs thereof as viewed upon a fluorescent screen by the utilization of X-rays comprising a cabinet provided with a translucent window, a source of illumination in said cabinet for projecting light rays toward said translucent window, means disposed between said source of illumination and said window for portraying upon said window a shadow simulating certain parts of the human anatomy as actually observed during a fluoroscopic examination, and means in said cabinet for superimposing a shadow upon said translucent window to portray various organs of the anatomy whereby a composite figure is produced upon said translucent window, depicting to an observer in front of said cabinet a picturization accurately simulating certain parts of the human anatomy and the natural motions of the various organs of a living human being as seen upon a fluorescent screen during a fluoroscopic examination.

2. An educational device for medical students that depicts an image of the human anatomy and the natural motion of various organs thereof as viewed upon a fluorescent screen by the utilization of X-rays comprising a cabinet provided with a translucent window, a source of illumination in said cabinet for projecting light rays toward said translucent window, means disposed between said source of illumination and said window for portraying upon said window a shadow simulating certain parts of the human anatomy as actually observed during a fluoroscopic examination, and oscillating means in said cabinet for casting a movable shadow upon said translucent window to depict the natural motion of various organs of the human anatomy of a living person as seen by an observer upon a fluorescent screen during a fluoroscopic examination.

3. An educational device for medical students that depicts an image of the human anatomy and the natural motion of various organs thereof as viewed upon a fluorescent screen by the utilization of X-rays comprising a cabinet provided with a translucent window, a source of illumination disposed in said cabinet for projecting light rays toward said translucent window, means disposed in said cabinet between said source of illumination and said translucent window for absorbing a portion of the light rays from said source and casting a shadow upon said translucent window simulating certain parts of the human anatomy as observed during a fluoroscopic examination, means disposed between said source of illumination and said first mentioned means for casting a shadow upon said translucent window having a configuration depicting certain organs of the human anatomy, and means connected to said last mentioned means and operable to cause oscillatory movement thereof whereby the shadow cast is caused to fluctuate and portray the natural motion of certain organs of the human anatomy to an observer in front of said cabinet in the same manner as would a living person during a fluoroscopic examination.

4. An educational device for medical students that depicts an image of the human anatomy and the natural motion of various organs thereof as viewed upon a fluorescent screen by the utilization of X-rays comprising a cabinet provided with a translucent window, a source of illumination disposed in said cabinet for projecting light rays toward said translucent window, means disposed in said cabinet between said source of illumination and said translucent window for absorbing a portion of the light rays from said source and casting a shadow upon said translucent window simulating certain parts of the human anatomy as observed during a fluoroscopic examination, and mechanism disposed in said cabinet and operable to cast a superimposed movable shadow upon the shadow cast by said last mentioned means to depict the natural motion of various organs of the anatomy whereby an observer in front of said cabinet obtains an accurate portrayal of certain parts of the human anatomy as actually seen upon a fluorescent screen during a fluoroscopic examination.

5. An educational device for medical students that depicts an image of the human anatomy and the natural motion of various organs thereof as viewed upon a fluorescent screen by the utilization of X-rays comprising a cabinet provided with a translucent window, a source of illumination disposed in said cabinet for projecting light rays toward said translucent window, a composite plate disposed in said cabinet between said source of illumination and said translucent window for absorbing a portion of the light rays from said source and casting a shadow upon said translucent window conforming to certain parts of the human anatomy as observed during a fluoroscopic examination, a plurality of members disposed in said cabinet and having a configuration adapted to cast a superimposed shadow upon the shadow cast by said composite plate simulating various organs of the anatomy, and mechanism operably connected to said last mentioned members for imparting oscillatory movement thereto in order to cause the shadow cast thereby to alter in configuration and accurately simulate the natural motion of the various organs portrayed as observed during a fluoroscopic examination of a living human being.

6. An educational device for medical students that depicts an image of the human anatomy and the natural motion of various organs thereof as viewed upon a fluorescent screen by the utilization of X-rays comprising a cabinet provided with a translucent window, a source of illumination disposed in said cabinet for projecting light rays toward said translucent window, means disposed in said cabinet between said source of illumination and said translucent window for absorbing a portion of the light rays from said source and casting a shadow upon said translucent window conforming to certain parts of the human anatomy as observed during a fluoroscopic examination, and mechanism disposed in said cabinet comprising a plurality of members interposed between said translucent window and said source of illumination having a configuration causing a shadow to be superimposed upon said translucent window depicting various organs of the human anatomy, an electric motor, a rotatable member connected to said motor for operation thereby and provided with a plurality of cam surfaces, and connections from said rotatable member to said plurality of members to cause oscillatory movement thereof with an alteration of the shadow cast by the latter upon said translucent window to portray the motion of the various organs as actually viewed during a fluoroscopic examination of a living human being.

GEORGE LEVENE.